April 30, 1940.  F. C. BEST  2,199,036
MOTOR VEHICLE
Filed Oct. 29, 1937  2 Sheets-Sheet 1
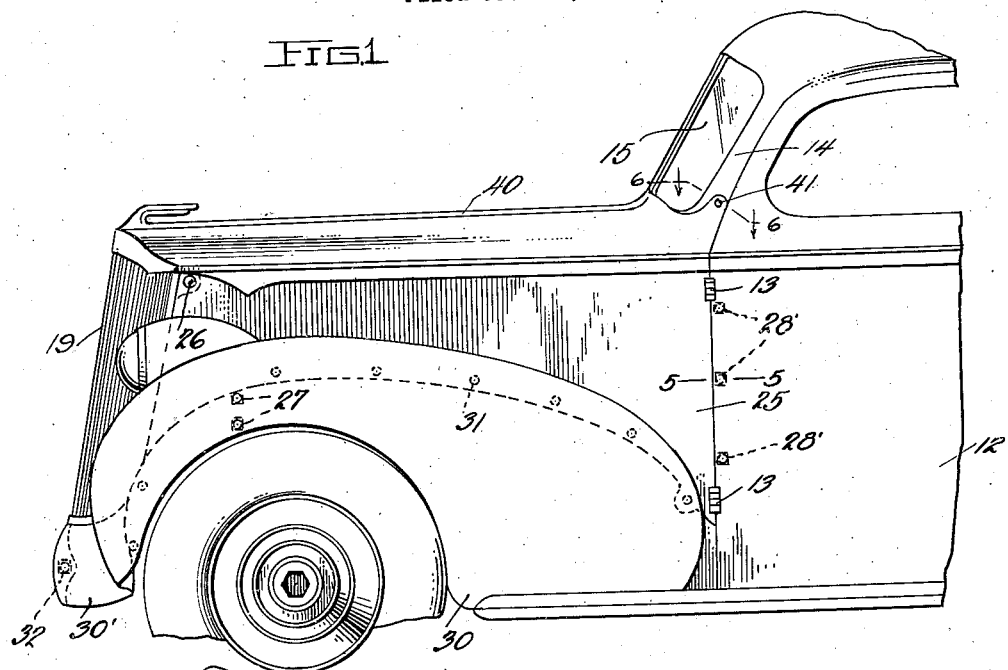
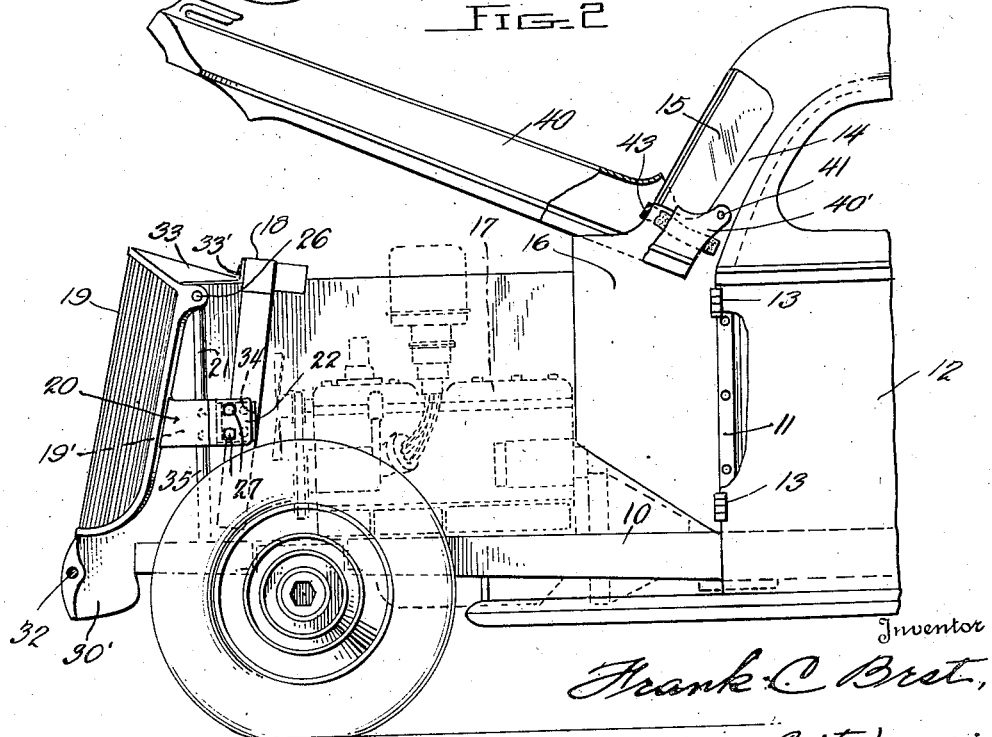
Inventor
Frank C. Best,
By Watson, Coit, Morse
& Grindle Attorney April 30, 1940.  F. C. BEST  2,199,036
MOTOR VEHICLE
Filed Oct. 29, 1937   2 Sheets-Sheet 2
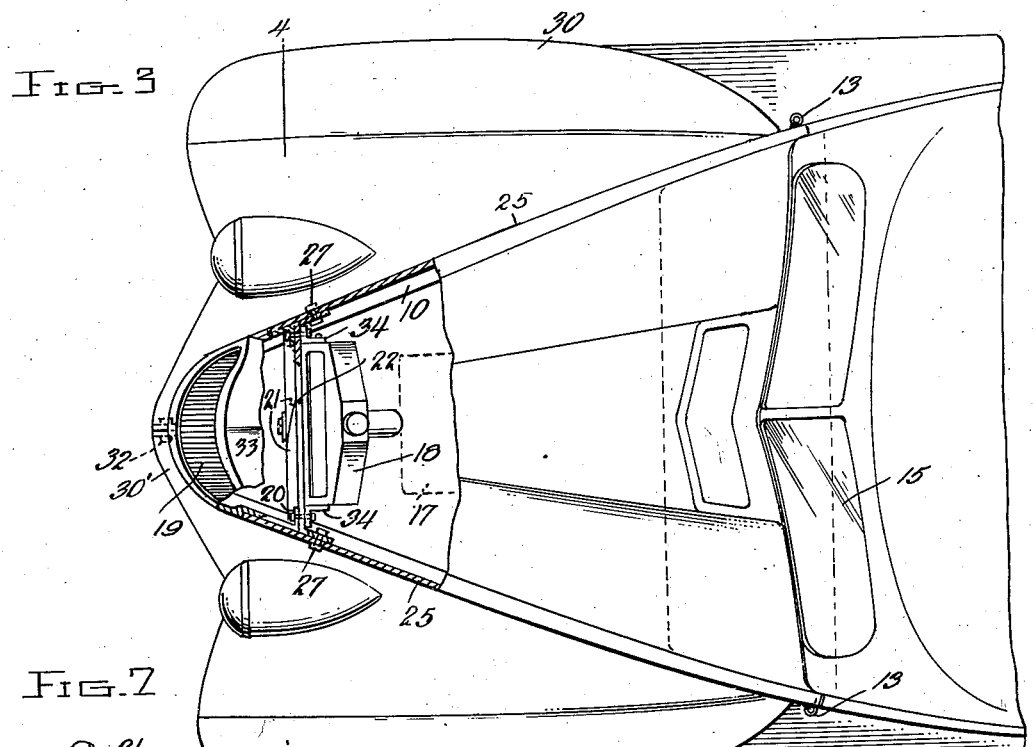
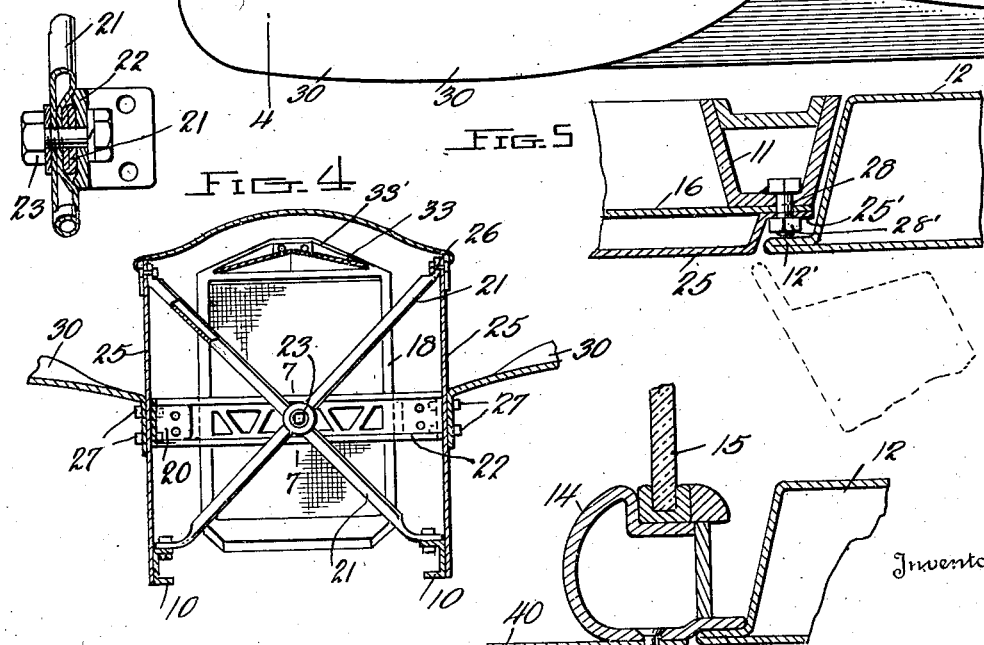

Patented Apr. 30, 1940

2,199,036

UNITED STATES PATENT OFFICE 2,199,036

MOTOR VEHICLE

Frank C. Best, Detroit, Mich., assignor to Packard Motor Car Company, Detroit, Mich., a corporation of Michigan Application October 29, 1937, Serial No. 171,794

10 Claims. (Cl. 180—69)

The present invention relates to the front end body construction of a motor vehicle of the type in which the engine is positioned in advance of the driver's seat and concealed from view and protected from the weather by a sheet metal casing, commonly designated a hood.

It is of course essential that the engine of a motor vehicle be readily accessible, together with the various supplementary mechanisms associated with the engine, for the purpose of lubrication, inspection and repair. In every case, therefore, the casing within which the engine is enclosed is provided with removable or displaceable sections which, when lifted or swung aside, make it possible for the operator, gas station attendant, or repair man to inspect, lubricate or adjust and repair the otherwise hidden mechanism. Usually the engine is covered by a hood comprising metallic sheets hingedly connected to a central longitudinally extending rod, either side of this hood being adapted to be lifted after its lower edge has been disconnected from the members to which it is customarily attached by latches or the like. Another type of casing now coming into widespread use comprises, instead of two side portions, either or both of which may be lifted, a single sheet metal door or bonnet overlying the engine, this bonnet having its forward end detachably secured in closed position by a single latch, and its rear end connected to the body for pivotal movement about a horizontal axis transverse to the body.

The present invention relates particularly to constructions of this last mentioned type and its purpose is to provide an improved construction having a number of important advantages over those heretofore designed or suggested. Thus the bonnet is so pivotally connected to the body that the horizontal axis about which it is rotated when lifted is in rear of and elevated substantially above the axes of pivotal movement of bonnets heretofore designed or used, so that greater clearance between the bonnet and the engine is obtained for a given angular upward movement of the bonnet and access to the engine and auxiliary mechanisms facilitated. Furthermore by so mounting the bonnet for pivotal movement it may be extended rearwarly to overlie the cowl and eliminate a hinge joint, the rear edge of the bonnet normally closely paralleling the upper edge of the cowl at the base of the windshield, the bonnet being unbroken from the windshield to its forward end, thus effectively excluding water and presenting an attractive appearance.

The invention also contemplates a novel and important radiator and radiator grill supporting means whereby these elements may be secured to the vehicle frame in advance of the engine in an improved manner, the use of the customary bracing struts being dispensed with and the side plates of the engine enclosing casing being made use of as longitudinally extending radiator bracing or supporting members. Again the side plates of the casing are detachably secured in position and the fenders are permanently secured to the side plates. The number of securing devices employed for the attachment of the side plates to the vehicle are minimized with the result that anyone desiring to completely expose the engine can do so quickly, each side plate and its associated and permanently attached fender being removable as a unitary structure. The various securing devices employed for the attachment of the side plates are, for the most part, hidden from the normal view of the observer with the result that the appearance of the vehicle body is enhanced.

By way of example one form of motor vehicle body construction embodying the several features of the invention is illustrated in the accompanying drawings, in which:

Figure 1 is a side view of the forward end of a motor vehicle embodying the invention;

Figure 2 is a similar view but showing the bonnet lifted, one side plate, with its attached fender, having been removed;

Figure 3 is a top plan view of the vehicle forward end, partially broken away;

Figure 4 is a section on line 4—4 of Figure 3;

Figure 5 is a section on line 5—5 of Figure 1;

Figure 6 is a section on line 6—6 of Figure 1; and

Figure 7 is a section on line 7—7 of Figure 4.

The vehicle body includes the usual supporting frame of which the side sills 10 comprise the principal or heavier members, these side sills being horizontally spaced from each other and extending longitudinally of the vehicle body in the customary manner. Extending upwardly from each side sill is a post or pillar 11 (shown in section in Figure 5), and which is of sufficiently heavy section to carry the weight of a door and to also serve as a stiffening member and a support for certain of the metallic covering sheets. A door is indicated at 12 and in Figures 1 and 2 the hinges by means of which the door is pivotally connected to the pillar 11 are indicated at 13. Above the upper hinge the pillar 11 terminates and the corner post 14 (shown in section in Figure 6) serves as a corner support for the top and as a support for the outer edge of the windshield, indicated at 15. The pillar 11 and corner post 14 may be, insofar as details of construction are concerned, of any of the usual types commonly employed in motor vehicle body construction. In any event the corner posts 14 comprise rigid integral portions of the frame of the vehicle body. The usual cowl is indicated at 16 and just in advance of the cowl is positioned the engine 17, the engine lying between the cowl and radiator 18. In advance of the radiator is an ornamental grill 19 and intermediate the radiator and grill is a structural support generally indicated at 20.

Support 20 is disposed in a vertical plane extending transversely of the side sills and comprises crossed tubular struts 21, the lower end of each strut 21 being secured by means of a bolt or other attachment device, to a side sill 10 and the upper ends of these struts being unsupported by any structural member. The support 20 also includes the horizontally disposed member 22, this member being attached at substantially its midpoint to the struts 21, a bolt 23 passing through the struts 21 where they intersect and also passing through member 22.

Side plates of sheet metal are indicated at 25, each of these side plates extending from a pillar 11 forwardly to the edge of the grill 19, the forward upper corner of each such side plate being attached to the upper end of a diagonal strut 21 by means of a bolt 26 and being secured to the rearwardly turned end of transverse member 22 of the support 20 by two bolts 27. At its rear edge each side plate is provided with an inwardly offset flange 25' which is attached to pillar 11 by three bolts 28. The head of each of bolts 28 is within the pillar 11 and preferably welded to the pillar, the rotatable nut 28' on the outer end of each bolt being normally concealed by the door flange or bead 12', as will be observed from an inspection of Figure 5. Each side plate is therefore secured in position by six bolts, three disposed along its rear edge and three adjacent its front edge. To the side plates are permanently secured the fenders 30, as by means of a series of rivets 31, each fender having a downwardly and inwardly extending portion 30' underlying the grill 19, the flanged edges of fender portions 30' being secured together by a bolt 32, and a so-called apron thus formed.

A wind deflecting pan is indicated at 33, the forward edge of this pan being secured to the upper edge of the grill 19 and its rear edge being provided with a flange 33' bolted or otherwise suitably secured to the upper forward face of the radiator 18. Radiator 18 also has its sides attached to the frame or support 20, by means of brackets 34, which brackets are rigidly attached to the transverse member 22 of the support. Extensions or flanges 19' project rearwardly from the lateral edges of the grill which extensions are also attached to the ends of transverse member 22 by one or the other, or both, securing bolts 27. It is clear, therefore, that the grill and radiator are mounted upon the support 20 and also that the support is braced against movement in a direction longitudinally of the vehicle by the side plates 25. These plates, however, are of sufficient stiffness to adequately brace the supporting frame 20 and prevent vibration of this frame, and vibration of the grill and radiator. By means of bolts 27 also the usual fender supporting brackets may be attached to the support 20. These have not been shown. The side plate securing bolts 28 are, as has previously been explained, normally concealed by the leading edge of the door 12, the attachment bolts 27 are normally concealed by the fenders and the bolt 32 is not visible, being behind the apron. Hence only one of the bolts which is made use of to secure each side plate and associated fender in position is normally visible, this being the bolt 26 and, if desired, this bolt may be either concealed or rendered highly ornamental for the sake of appearances.

Should it be desired to remove a side plate and fender in order that complete access may be had to the engine, radiator and auxiliary devices, the door 12 may be opened, bolts 28 removed and bolts, 27, 26 and 32 removed, whereupon the side plate and fender assembly may be lifted from position. This may be done very quickly and with a great saving in time as compared with prior body constructions. Replacement of side plate and fender may be accomplished with equal ease.

The bonnet is indicated by the numeral 40 and is seen to comprise a single unitary member mounted for pivotal movement about a horizontal transverse axis at its rear edge. Thus the bonnet has at each of its rear corners an upward extension 40' provided with an aperture to receive a bolt 41 fixed upon the corner post 14. The rear margin of the bonnet 40 is upwardly curved to follow the configuration of the upper surface of the cowl 16 when the bonnet is in its lowered position and a sealing strip 43 of rubber or composition material is interposed between the upper surface of the cowl and the undersurface of the bonnet, being preferably secured to the cowl, this sealing strip being engaged by the bonnet when the bonnet is in lowered position, thus preventing inflow of water. The rear edge of the bonnet closely follows the upper edge of the cowl at the base of the windshield and bonnet is unbroken between its ends. The attractiveness of the design is apparent, and complete protection of the motor from water damage obtained.

Having thus described the invention, what is claimed as new and desired to be secured by Letters Patent is:

1. A motor vehicle body construction comprising, in combination, spaced side sills, a transversely extending support mounted on and bridging said sills adjacent the forward ends thereof, a grill in advance of said support, a radiator in rear thereof, means connecting the top of the grill to the top of the support, means connecting the top of the grill to the top of the radiator, and additional means connecting the radiator and support whereby the weight of the radiator is transferred to the support.

2. A motor vehicle body construction comprising, in combination, spaced side sills, a transversely extending support mounted on and bridging said sills adjacent the forward ends thereof, a grill in advance of said support, a radiator in rear thereof, a pan having its forward edge connected to the top of the grill and its rearward edge connected to the top of the radiator, and additional means connecting the radiator and support whereby the weight of the radiator is transferred to the support.

3. A motor vehicle body construction comprising, in combination, spaced side sills, a transversely extending support mounted on and bridging said sills adjacent the forward ends thereof, a grill in advance of said support, a radiator in rear thereof, a pan having its forward edge connected to the top of the grill and its rearward edge connected to the top of the radiator, and brackets connecting the sides of the radiator to the support whereby the weight of the radiator is transferred to the support.

4. The combination set forth in claim 1 in which said support comprises crossed struts and a transverse member, the ends of said transverse member being connected to the sides of the radiator respectively.

5. A motor vehicle body construction comprising spaced side sills, longitudinally spaced structural members mounted on said sills, side plates having their ends detachably secured to said members, and fenders permanently secured to said side plates whereby the side plates and fenders may be simultaneously removed.

6. A motor vehicle body construction comprising a side sill, longitudinally spaced structural members, extending upwardly therefrom, a side plate having its forward and rearward ends detachably connected to said members, and a fender permanently attached to said side plate.

7. The combination set forth in claim 6 in which the rearward structural member comprises a door frame pillar, the rear edge of the side plate is attached to said pillar by bolts or like means, and a door has a portion overlying and hiding said bolts when closed, the bolts being accessible when the door is open.

8. A motor vehicle body construction comprising a side sill, a door frame pillar, a side plate having its rear edge detachably secured to said pillar by attaching means having manually operable elements, and a door having an edge portion overlying and hiding said elements when closed, said elements being accessible and operable from without the vehicle body when the door is open.

9. A motor vehicle body construction comprising, in combination, spaced side sills, frame members extending upwardly from said side sills, side plates extending forwardly from said frame members, the rear ends of said plates being directly attached to said frame members, a transversely extending support mounted on said sills in advance of said frame members, the forward ends of said side plates being directly attached to said support, a radiator, a horizontally extending member affixed to the support, brackets at the ends thereof connected to the sides of the radiator, and means connecting the top of the radiator to the support.

10. A motor vehicle body construction comprising upstanding corner posts, a cowl intermediate the corner posts and extending forwardly therefrom, the top of the cowl being imperforate and there being an engine space in advance of the cowl, and a bonnet normally overlying the engine space and cowl, said bonnet having, at its rear end, laterally spaced portions pivotally connected directly to said corner posts, respectively, whereby the bonnet may be rocked upwardly about an axis passing through said points of pivotal connection to uncover the engine space.

FRANK C. BEST.